(No Model.) 2 Sheets—Sheet 1.

T. C. ST. JOHN.
CORN HARVESTER.

No. 460,315. Patented Sept. 29, 1891.

WITNESSES:
Frederick G. Comming
Mr. J. Spencer

INVENTOR
Thomas C. St. John.
BY
Henry F. Parker
ATTORNEY (No Model.)  2 Sheets—Sheet 2.
T. C. ST. JOHN.
CORN HARVESTER.
No. 460,315.  Patented Sept. 29, 1891.
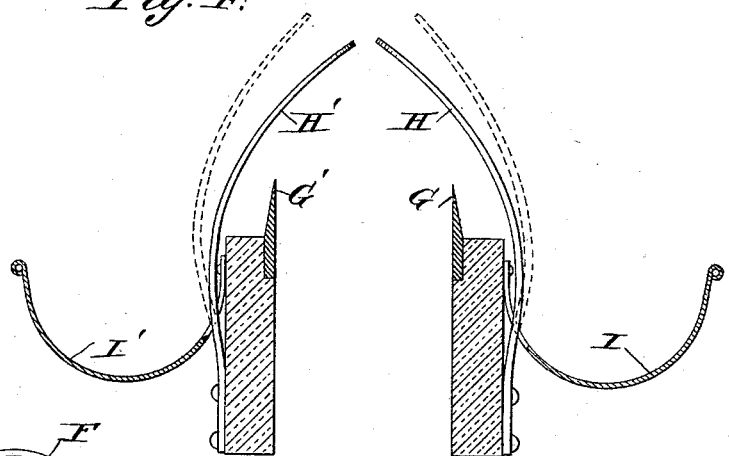
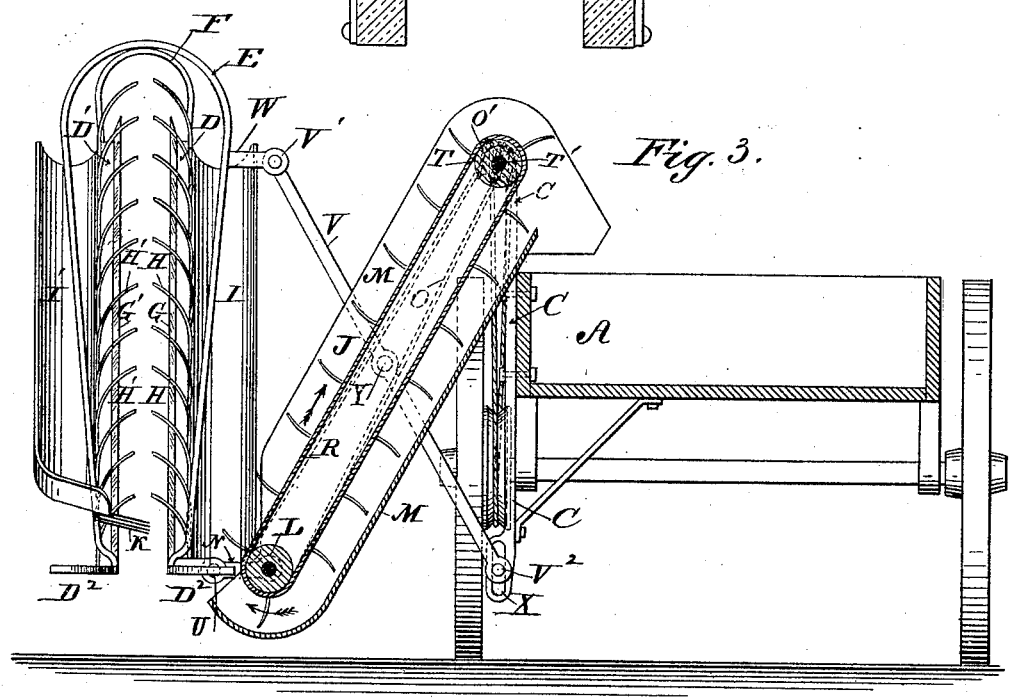
WITNESSES:
INVENTOR
BY
ATTORNEY

UNITED STATES PATENT OFFICE.

THOMAS C. ST. JOHN, OF WILLOUGHBY, OHIO.

CORN-HARVESTER.

SPECIFICATION forming part of Letters Patent No. 460,315, dated September 29, 1891.

Application filed May 22, 1891. Serial No. 393,781. (No model.)

*To all whom it may concern:*

Be it known that I, THOMAS C. ST. JOHN, of Willoughby, Lake county, Ohio, have invented certain new and useful Improvements in Corn-Harvesters, of which the following is a specification.

My invention relates to improvements in corn-harvesting machines of the character illustrated and described in Letters Patent No. 447,624, issued to me March 3, 1891. The essential features therein consist in two inclined parallel bars adapted to straddle a row of cornstalks, said bars being connected by inverted-U-shaped frames, providing a free and unobstructed passage between them. These bars have knife-edges at their upper edges, and are provided with a series of fingers pivotally connected at one end and adapted to swing at their free ends upward and outward from their normal position in which they incline in vertical planes to intercept or partially intercept the passage through which the cornstalks pass.

The object of my present improvement is to simplify the construction, rendering the parts more durable and more positive in their action.

To these ends my said improvement consists in providing spring fingers or blades intercepting the passage of the stalks in the manner above indicated, projecting at fixed points on the inclined parallel bars, and so shaped as to promote lateral resiliency but longitudinal rigidity of said springs with reference to the direction of the travel of the machine. As in the device set forth in the aforesaid Letters Patent, the general organization is such that it is adapted to be mounted on an ordinary farm-wagon, which can be readily drawn over the fields for cutting the ears from the stalks by means of the machine attached to the wagon; but I herein also provide an additional feature whereby the parallel bars for the passage of the stalks may automatically swing at variable distances from the wagon to accommodate any irregularities in the rows of stalks or guidance of the wagon with reference thereto.

In order to enable others skilled in the art to which my invention appertains to construct and use my said improved machine, I will proceed to describe the details of its construction, and subsequently point out in the appended claims its novel characteristics as distinguished from those heretofore employed.

Figure 1:
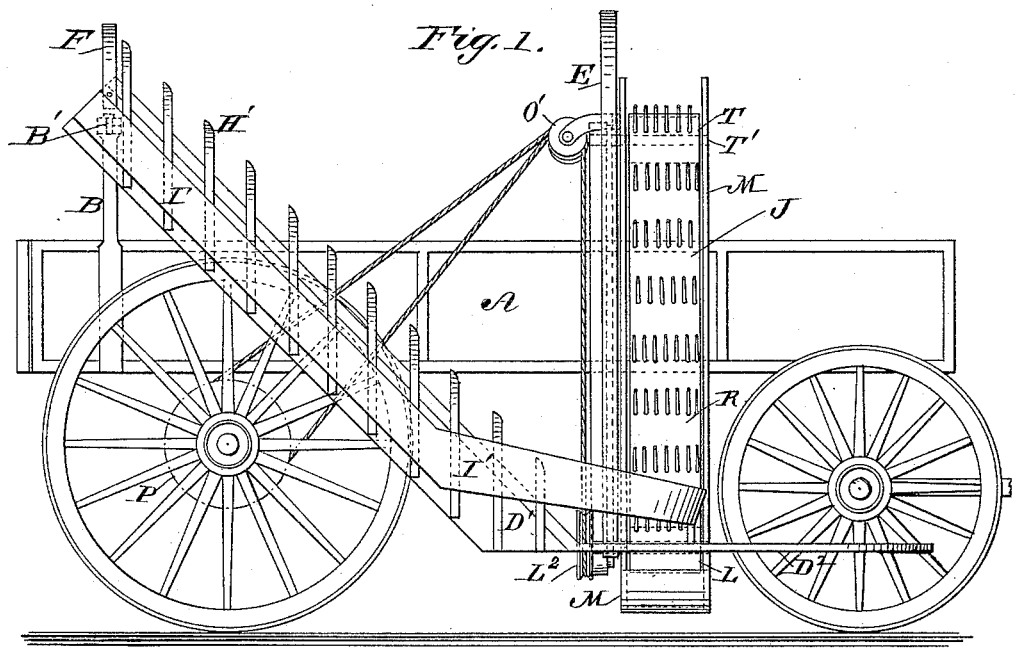
Figure 2:
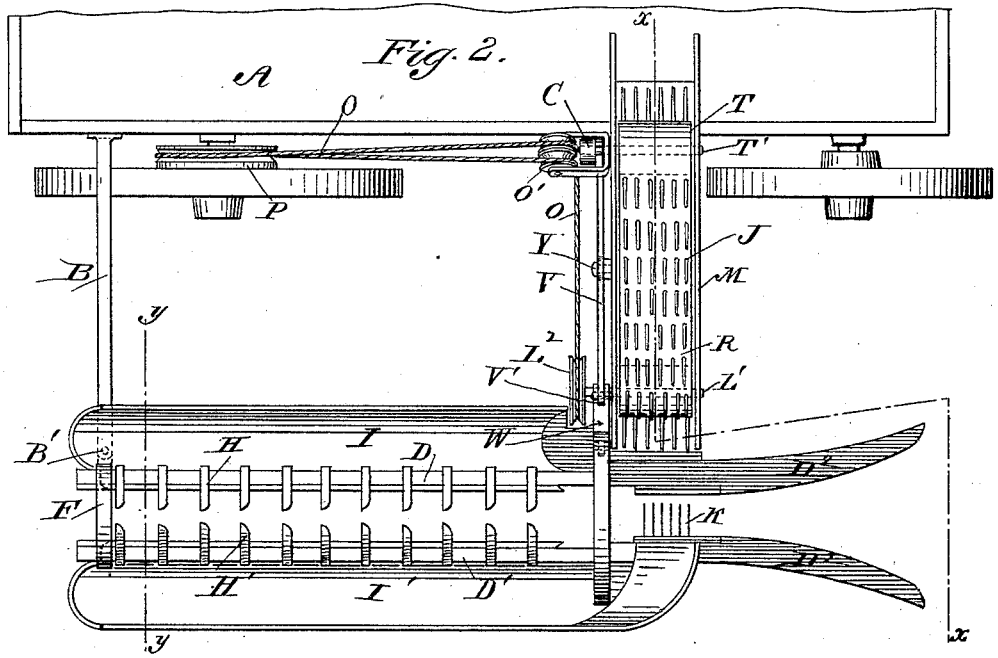

Referring to the accompanying drawings, in which like letters of reference indicate corresponding parts throughout the several views, Figure 1 is a general side elevation of the machine attached to a wagon; Fig. 2, a plan view thereof; Fig. 3, an end elevation taken partly in section on the line $x$ $x$, Fig. 2; and Fig. 4 an enlarged detail view showing in cross-section on the line $y$ $y$, Fig. 2, the parallel bars and knives thereon and the spring fingers or blades acting as feeders for the knives projecting upward and over the space between the bars.

A represents the body of the wagon to which the machine is attached.

B C represent the supporting-bars attached to the side of the wagon and from which the parallel bars D D' are supported. The bars D D' are sustained in fixed relation with reference to each other by means of the inverted-U-shaped bar E, depending vertically from and connected with the lower portions of the said bars and by a similarly-shaped frame F, attached to the upper ends of said bars D D'. The tops of the bars E and F are sufficiently high above the ground to permit the stalks to pass freely beneath them, as will appear in Fig. 3.

The bars D D' are each provided at their inner edges with upturned knife-edges G and G', respectively, extending the length of the inclined portion of the said bars. The lower extremities of the bars D and D' are extended horizontally at the front of the machine, as shown at $D^2$, and curved outwardly, as plainly shown in Fig. 2. Owing to the inclined position of the knives G and G' the ears of corn are severed with equal effect irrespective of their height on the stalk above ground.

On the outside of the bars D D' are secured the series of spring fingers or blades H H', fixed rigidly at their lower portions to the said bars, said fingers or blades inclining in vertical planes to points over and above the center of the passage between the inclined bars D D'. The springs H H' are of less thickness than breadth, whereby to permit the passage of the stalks by the yielding motion of said springs in a direction transverse to the machine, as indicated by dotted lines in Fig 4, while preserving their rigidity as opposed to the longitudinal direction of travel of the machine.

On the outside of the bars D and D' are arranged troughs or chutes I and I', respectively, as plainly shown in Fig. 4, the lower end of the chute I discharging onto the elevator J, which moves upward on the side of its orbit nearest the said chute, while the lower end of the chute I' discharges onto a series of transversely-extending spring-fingers K, which lead into the lower end of the chute I, so that the ears of corn passing down the said chute I' are transmitted across the space between the bars D and D' and also onto the elevator.

The elevator J consists in a box or frame M, in which the upper and lower rollers T and L, respectively bearing the apron R, have journals. The apron R is provided with forks or suitable buckets upwardly disposed on the ascending path of the apron R, and the lower roller L is placed in such position with reference to the bottom of the chute I that the forks upon the apron R shall pass under the terminus of the said chute and upward through the base thereof, insuring their effectively catching all the ears of corn deposited. The upper end of the elevator is swiveled upon its own shaft T' of the roller T, the same passing through the upper end of the vertical supporting-bar C. The lower end of the elevator is pivoted by the shaft L of the roller L to the link N, pivoted at U. There is a diagonal bar V pivoted to the frame E at V' upon the rigid arm W, and also pivoted upon its pin V², which is permitted to move vertically in a slot X, Fig. 3, at the lower extremity of the supporting-bar C. The bar V and the box or frame of the elevator J are pivotally connected at a point midway to their respective extremities at Y. Thus a parallel movement is effected, whereby the harvesting mechanism supported from the wagon is maintained at a given horizontal level with reference thereto, irrespective of its lateral change of position due to the engagement of the diverging bars D² D² with stalks at varying distances from the wagon. Moreover, during such change of position the action of the elevator is not interfered with. The bracket B, as seen in Fig. 2, is pivoted at B' by a vertical pin to the upper and rear extremity of the frame of the machine, whereby that extremity where the flexible tops of the stalks pass is maintained at a fixed distance from the wagon, while the hereinbefore-described parallel moving mechanism supports the lower and foremost end of the machine-frame in the movable manner described. The elevator J is driven by means of a pulley L² on the shaft of its lower roller L', and this pulley receives its motion by means of an endless belt O, passing over idlers O', attached to the elevator-frame as nearly coincident as possible with the pivotal axis T', upon which the elevator swings when moved, said belt also passing over a grooved pulley P, secured to the face of one wheel of the wagon A. Thus when the wagon is drawn forward over the ground the wagon-wheel in turning causes the pulley P to move with it, and drives the belt O, which in passing over the pulley L² actuates the elevator in the proper direction accordingly.

The operation is as follows: The wagon A is drawn over the field in such a manner that the cornstalks pass into the outwardly-curved horizontally-extending ends D² of the bars D and D'. The stalks, on the further motion of the wagon A, come in contact with the spring-fingers or resilient blades H and H', until the respective ears of corn, at whatever height they may be attached to the stalk, come in contact with one or more of those fingers, and then by the natural resistance of the roots of the stalks each ear is drawn down the respective finger or fingers on the upper or outer side thereof, thus causing the stem of the ear to be drawn toward the cutting-edge G or G' as the stalk bends during the travel of the machine. The cutting-edge G or G' accordingly cuts the ear off at its butt-end, the stalk being thereby released and passing freely upward toward its erect position between the remaining spring-fingers, which yield in the manner before described, and on out of the open slot between the parallel bars D and D', and also under the bar F without breaking or injuring the stalk, while the cut ear slides down the respective chute I or I', to be taken up by the elevator J and deposited in the wagon.

It will be seen that the operation of my present machine differs from that described in the aforesaid Letters Patent, inasmuch as the spring-fingers H or H' do not swing wholly apart from the passage-way of the stalks, but merely bend a sufficient distance to permit each stalk to be drawn through, quickly returning to their normal position in time to engage with certainty upon the succeeding stalks as they come in contact with the successive fingers at successive heights. In the patent before referred to, the fingers H H', being pivotally connected at their lower ends, depend upon gravity to resume their normal position, and, moreover, when the machine is driven rapidly there is a possibility of some one or more of them being thrown out of position or otherwise displaced, so that they may not gravitate back into their normal position with sufficient promptness. Moreover, the spring-fingers H H', herewith illustrated, admitting of being constructed of thin pieces of metal, present a narrow edge to the progress of the stalk or husks thereon, aiding the knives G G' to sever the same.

Having thus fully described my invention, what I claim, and desire to secure by Letters Patent, is—

1. In a corn-harvester having inclined parallel knives forming a passage between them for the stalks, a series of spring fingers or blades inclined in vertical planes transverse to the said passage and having a resiliency to move in the direction of said planes, but rigidity with reference to the direction of travel of the machine.

2. In a corn-harvester, the combination, with the inclined parallel bars and cutting-knives thereon, having an interval between them forming a passage for the stalks, of a series of spring fingers or blades fixed rigidly at their lower ends to each of the bars and extending upward and inward toward one another above the middle of said passage, the said fingers being flattened in form and thereby adapted by their flexibility to swing transversely only to the said passage, for the purpose described.

3. In a corn-harvester of the character described, having a vertical passage for the stalks, the combination thereof with a wagon and a supporting-frame for the said harvester, consisting in the inclined elevator or other frame pivoted to the upper portion of the frame of the wagon and to the lower portion of the harvester, and an oppositely-inclined bar pivoted to the upper portion of the harvester and to the lower portion of the frame of the wagon, said bar and elevator-frame being intermediately pivoted to each other and provided with vertically-yielding connections, as the link N or slotted joint $V^2$ X, to permit the angular expansion and contraction of the said supporting-frame and lateral motion of the harvester, for the purposes described.

4. The combination of a wagon, a corn-harvester having inclined parallel bars, as described, forming a passage for the stalks, an elevator consisting in an endless belt and rollers thereof, and a frame or box pivoted at its upper end to the wagon and at its lower end to the front of the harvester-frame, and mechanism for supporting the harvester and permitting its lateral movement with reference to the wagon, substantially as described.

THOMAS C. ST. JOHN.

Witnesses:
 LEWIS COON,
 M. J. SPENCER.